United States Patent
Chan et al.

(10) Patent No.: US 9,020,322 B2
(45) Date of Patent: Apr. 28, 2015

(54) OPTICAL MODULE CONNECTOR SYSTEM AND METHOD

(71) Applicant: Avago Technologies General IP (Singapore) Pte. Ltd., Singapore (SG)

(72) Inventors: Seng-Kum Chan, Santa Clara, CA (US); David J. K. Meadowcroft, San Jose, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 13/950,448

(22) Filed: Jul. 25, 2013

(65) Prior Publication Data
US 2015/0030299 A1 Jan. 29, 2015

(51) Int. Cl.
*G02B 6/00* (2006.01)
*G02B 6/36* (2006.01)

(52) U.S. Cl.
CPC ........................................ *G02B 6/36* (2013.01)

(58) Field of Classification Search
CPC ..................................................... G02B 6/426
USPC .......................................................... 385/139
See application file for complete search history.

(56) References Cited

U.S. PATENT DOCUMENTS

| 5,619,604 | A | 4/1997 | Shiflett et al. |
| 8,083,418 | B2 | 12/2011 | Fujiwara et al. |
| 2010/0135618 | A1* | 6/2010 | Howard et al. ................. 385/79 |

OTHER PUBLICATIONS

US CONEC Product Catalog 2013/2014, [online], [retrieved on Jul. 2, 2013]. Retrieved from the Internet: <http://www.usconec.com/LiteratureRetrieve.aspx?ID=152122>.

* cited by examiner

*Primary Examiner* — Ryan Lepisto (57) ABSTRACT

A connector cover includes a body having a lower recessed portion configured to receive a portion of a reflecting connector of a type that retains the ends of optical fibers therein and has a reflector that redirects or turns the optical signals. The body has an upper housing portion that covers the reflector when the reflecting connector is received in the lower recessed portion of the body. The body also has a pair of arms extending from a forward end of the body. Each arm has a distal end with an arm distal end engagement. The arms are configured to engage a portion of an optical transceiver module.

19 Claims, 7 Drawing Sheets

OPTICAL MODULE CONNECTOR SYSTEM AND METHOD

BACKGROUND

Optical data transceiver modules convert optical signals received via an optical fiber into electrical signals and convert electrical signals into optical signals for transmission via an optical fiber. In the transmitter portion of a transceiver module, a light source such as a laser performs the electrical-to-optical signal conversion. In the receiver portion of the transceiver module, a light receiver such as a photodiode performs the optical-to-electrical signal conversion. A transceiver module commonly also includes optical elements, such as lenses, as well as electrical circuitry such as drivers and receivers. A transceiver module also includes one or more fiber ports to which an optical fiber cable is connected. The light source, light receiver, optical elements and electrical circuitry are mounted within a module housing. The one or more fiber ports are located on the module housing.

Various transceiver module configurations are known. One type of transceiver module configuration is known as a mid-plane mounting configuration. A transceiver module having a mid-plane mounting configuration commonly has a module housing with a generally square base and a low height. The base or bottom of the module housing has an array of electrical contacts, such as a Ball Grid Array (BGA), on its lower surface. A fiber port is located on the upper portion or top of the module housing. In some transceiver modules, the fiber port can be connected to an optical ribbon cable ferrule or connector. The optical ribbon cable connector thus terminates and retains the end of an optical ribbon cable comprising multiple optical fibers. The optical ribbon cable connector can have a plug-like shape that is mechanically received in a mating region of the fiber port. When the optical ribbon cable connector is received in or retained in the transceiver module fiber port, optical ports of the optical ribbon cable connector are aligned along optical paths with corresponding optical ports of the transceiver module fiber port. Thus, when the optical ribbon cable connector is received in or retained in the transceiver module fiber port, optical signals can be communicated along these optical paths between the optical ribbon cable connector and the transceiver module fiber port.

An optical ribbon cable connector can include reflective surfaces that redirect or "turn" optical signals between the ends of the fibers and the above-referenced optical paths. Such a connector may be referred to as a reflecting connector or optical-turn connector. The optical paths between a reflecting connector and a transceiver module are commonly perpendicular to the optical axes of the ends of the fibers retained in the reflecting connector. Thus, an optical signal emitted from the end of a fiber is reflected at an angle of 90 degrees through a corresponding optical port of the reflecting connector and into the transceiver module fiber port. Similarly, an optical signal emitted from the transceiver module fiber port is reflected at an angle of 90 degrees into a corresponding optical port of the reflecting connector and into the end of a fiber. The optical ports of the reflecting connector through which the optical signals are communicated are located on the lower portion of the reflecting connector. A pair of alignment pins commonly extends from the lower portion of a reflecting connector.

It is known to provide a cover that fits over the upper portion of a reflecting connector. The upper portion of the cover protects the reflective surfaces against contamination by dust or other foreign matter that could impair the reflectivity. The lower portion of the cover includes latching projections or ears. The latching ears have openings that are configured to engage protuberances on the module housing. As the cover-and-connector assembly is lowered onto the module, the alignment pins of the reflecting connector are received in corresponding bores in the module housing, and the latching ears of the cover snap onto the protuberances on the module housing to retain the cover and thus the reflecting connector in place on the transceiver module.

Although the above-described latching procedure may seem straightforward, in actuality a user may find it difficult to align the cover with the module and snap the cover into place due to the relatively small size of the module (e.g., commonly on the order of 20 mm on each side of the base of the module housing) and accordingly small size of the cover-and-connector assembly. The alignment pins are correspondingly small and easily damaged if forced against a surface. Also, due to the latching ears extending beyond the lower portion of the reflecting connector, the cover-and-connector assembly has a relatively high profile.

SUMMARY

Embodiments of the present invention relate to a connector cover, optical transceiver connector system, and method for connecting a reflecting connector to an optical transceiver module using the connector cover. The reflecting connector is of a type having a plurality of fiber ports for retaining ends of a plurality of optical fibers therein, and an upper portion with at least one optical reflector.

In one aspect of illustrative embodiments of the present invention, the connector cover comprises a body having a lower recessed portion configured to receive a portion of the reflecting connector. The body further has an upper housing portion that covers the optical reflector when the reflecting connector is received in the lower recessed portion of the body. The body also has a pair of arms extending from a forward end of the body. Each arm has a distal end with an arm distal end engagement.

In another aspect of illustrative embodiments of the present invention, a method for using the connector cover comprises sliding a forward end of the reflecting connector into a rearward end of a body of the connector cover. The body of the connector cover has a lower recessed portion configured to receive a portion of the reflecting connector when the forward end of the reflecting connector is slid into the rearward end of the body of the connector cover. The body of the connector cover further has an upper housing portion that covers the optical reflector when the reflecting connector is received in the lower recessed portion of the body. A pair of arms extends from a forward end of the body. Each arm has a distal end with an arm distal end engagement.

In still another aspect of illustrative embodiments of the present invention, an optical transceiver connector system comprises the connector cover and an optical transceiver module. The connector cover includes a body and a pair of arms extending from a forward end of the body. Each arm has a distal end with an arm distal end engagement. The body has a lower recessed portion configured to receive a portion of the reflecting connector. The body further has an upper housing portion that covers the optical reflector when the reflecting connector is received in the lower recessed portion of the body. The optical transceiver module includes a pair of transceiver module housing engagements configured to engage the arm distal end engagements.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
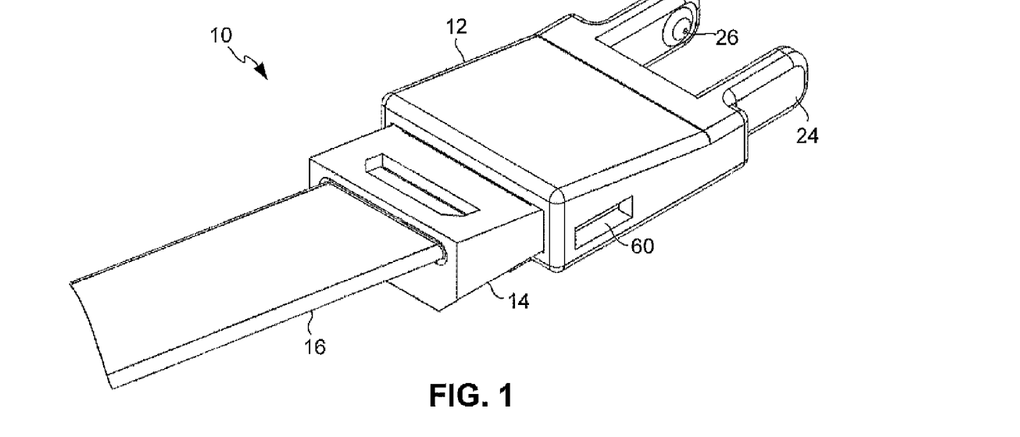
FIG. 1 is a top perspective view of a connector cover attached to a reflecting optical connector, in accordance with an exemplary embodiment of the invention.
Figure 2:
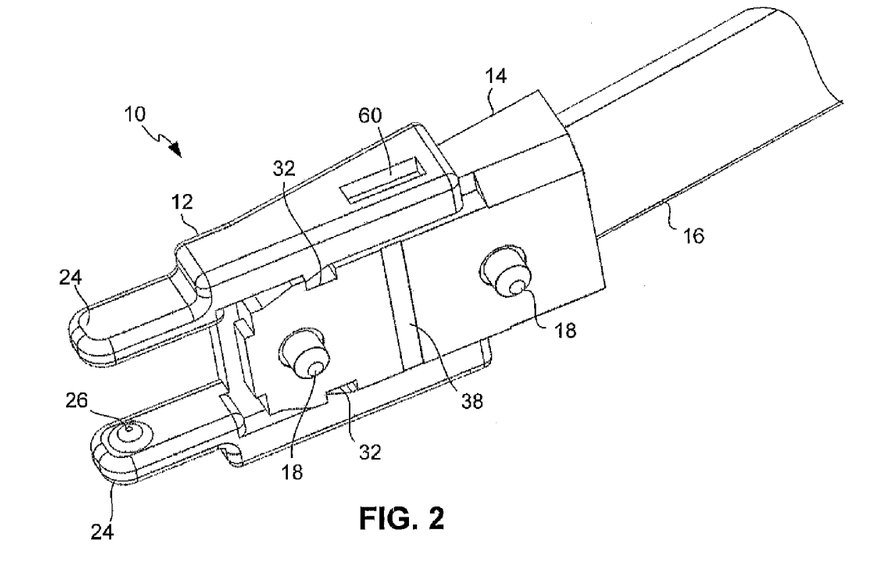
FIG. 2 is a bottom perspective view of the connector cover and reflecting optical connector of FIG. 1.

As illustrated in FIGS. 1-2, in an illustrative or exemplary embodiment of the invention, an optical cable connector assembly 10 comprises a connector cover 12 attached to a reflecting optical connector 14. An optical ribbon cable 16 extends rearwardly from reflecting optical connector 14. A pair of alignment pins 18 (FIG. 2) extends from the lower portion or bottom of reflecting optical connector 14.

Figure 3:
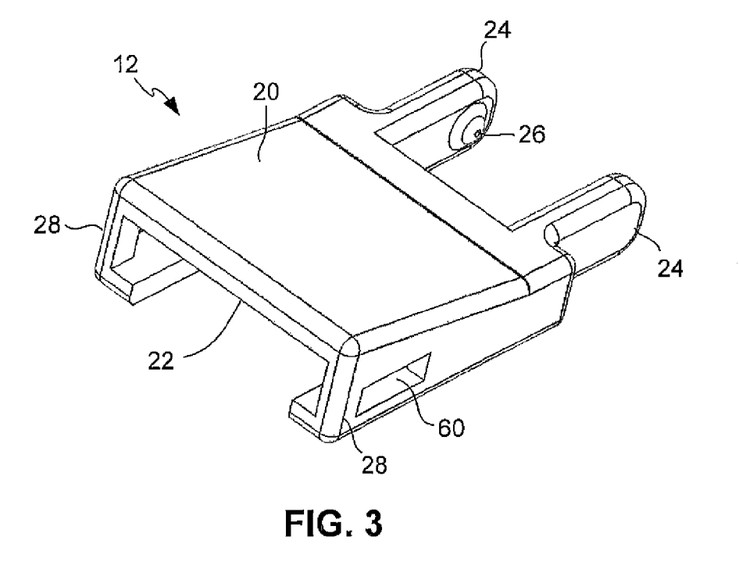
FIG. 3 is a top perspective view of the connector cover of FIGS. 1-2.
Figure 4:
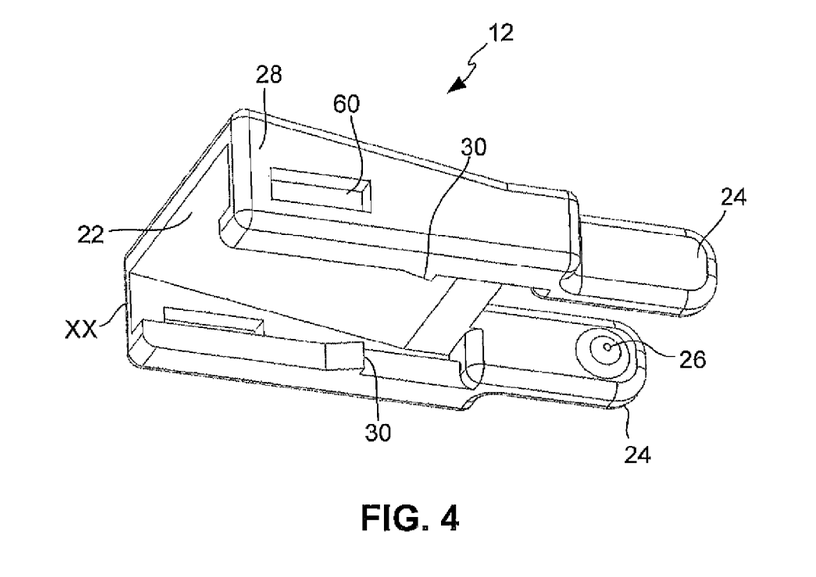
FIG. 4 is a bottom perspective view of the connector cover of FIGS. 1-2.

As illustrated in FIGS. 3-4, the body of connector cover 12 is defined in part by an upper housing portion 20 and in part by a lower recessed portion 22. A pair of arms 24 extends from a forward end of the body of connector cover 12. The distal ends of arms 24 have protuberances 26 on their inside surfaces, i.e., the sides of arm 24 facing the space between arms 24. Lower recessed portion 22 has a pair of L-shaped sidewalls 28. That is, each L-shaped sidewall 28 extends downwardly from upper housing portion 20. The pair of L-shaped sidewalls 28 defines the bottom or lower extent of lower recessed portion 22. A pair of ramp-shaped protrusions 30 (FIG. 4) in L-shaped sidewalls 28 are configured to engage corresponding recesses 32 (FIG. 2) in reflecting optical connector 14.

Figure 5:
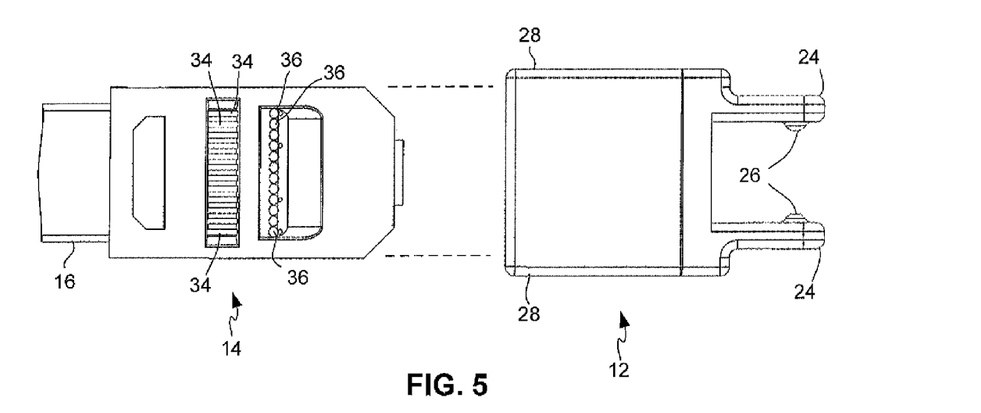
FIG. 5 is a top plan view illustrating a method of assembling the connector cover and reflecting optical connector of FIGS. 1-2.

With reference to FIG. 5, reflecting optical connector 14 can be of a conventional type. An example of a suitable reflecting optical connector 14 is the PRIZM® LightTurn connector available from US Conec Ltd. of Hickory, N.C. As illustrated in FIG. 5, reflecting optical connector 14 retains the fiber ends 34 of optical ribbon cable 16. Fiber ends 34 are optically aligned with corresponding reflective surfaces 36, which commonly comprise total internal reflection (TIR) reflectors. An optical signal emitted from a face (not shown) of one of fiber ends 34 is reflected at an angle of 90 degrees and exits reflecting optical connector 14 through an optical port region 38 (FIG. 2). Similarly, an optical signal entering optical connector 14 through optical port region 38 is reflected at an angle of 90 degrees into the face one of fiber ends 34.

Figure 6:
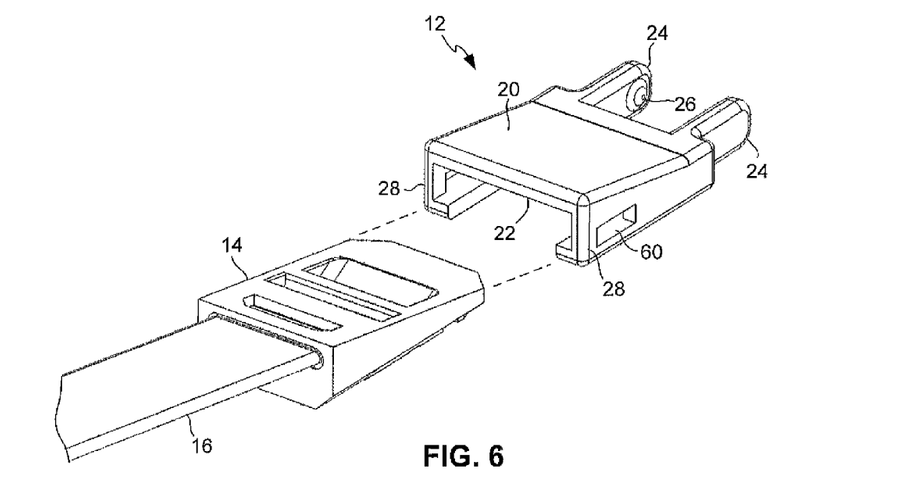
FIG. 6 is a perspective view illustrating the method of assembling the connector cover and reflecting optical connector of FIGS. 1-2.

As illustrated in FIGS. 5-6, optical cable connector assembly 10 (FIGS. 1-2) is assembled by inserting the forward end of reflecting optical connector 14 into the open rearward end of connector cover 12. The open rearward end of connector cover 12 is defined by lower recessed portion 22 and L-shaped sidewalls 28. As reflecting optical connector 14 is inserted into the open rearward end of connector cover 12, reflecting optical connector 14 slides into the cavity bounded in part by lower recessed portion 22 and L-shaped sidewalls 28. Thus, portions of lower recessed portion 22 and L-shaped sidewalls 28 help guide reflecting optical connector 14 into place. Ramp-shaped protrusions 30 (FIG. 4) engage recesses 32 (FIG. 2) to retain optical connector 14 and connector cover 12 together. Note that when reflecting optical connector 14 is assembled to connector cover 12 in this manner, upper housing portion 20 of connector cover 12 covers reflective surfaces 36, thereby protecting them against contamination by dust or other foreign matter.

As illustrated in FIGS. 7-10, a user (not shown) can connect optical cable connector assembly 10 to a mid-plane-mountable optical transceiver module 40. Although not shown for purposes of clarity, optical transceiver module 40 is mounted on the surface of a printed circuit board or similar planar surface. A Ball Grid Array (BGA) or similar array of electrical contacts (not shown) on the bottom of optical transceiver module 40 is coupled to corresponding electrical contact pads (not shown) on the printed circuit board.

Figure 7:
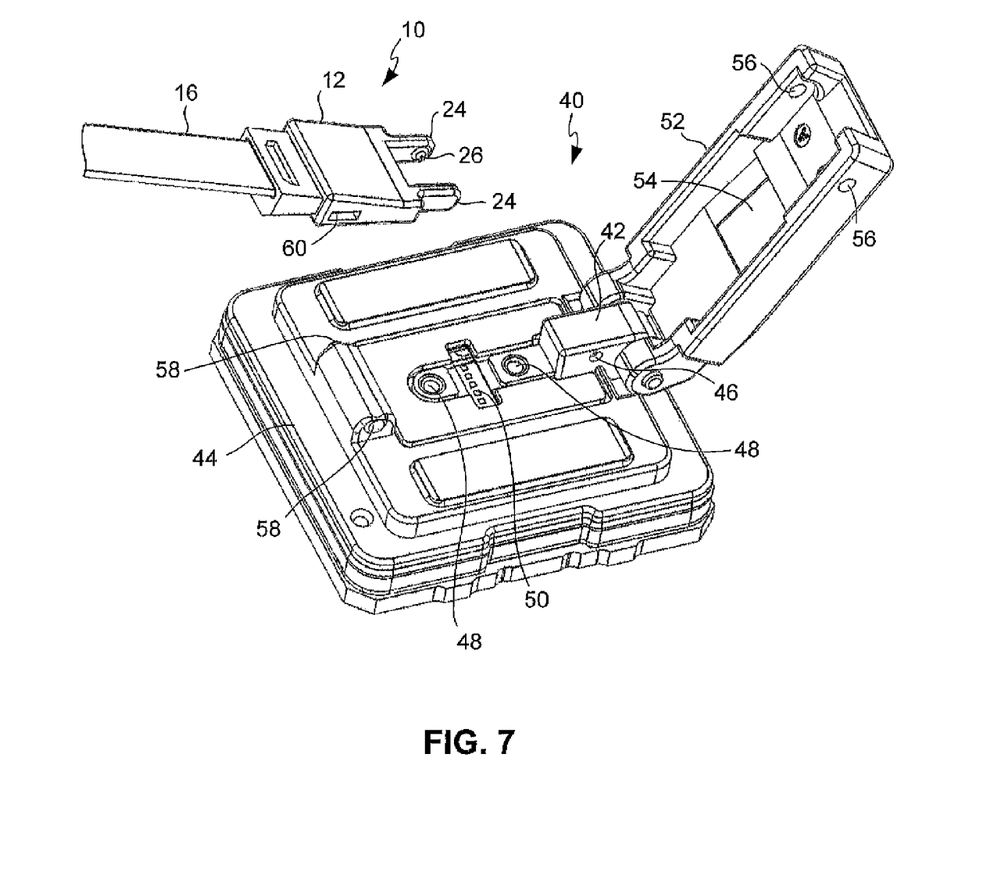
FIG. 7 is a perspective view illustrating a method of connecting the connector cover and connector assembly to an optical transceiver module.
Figure 8:
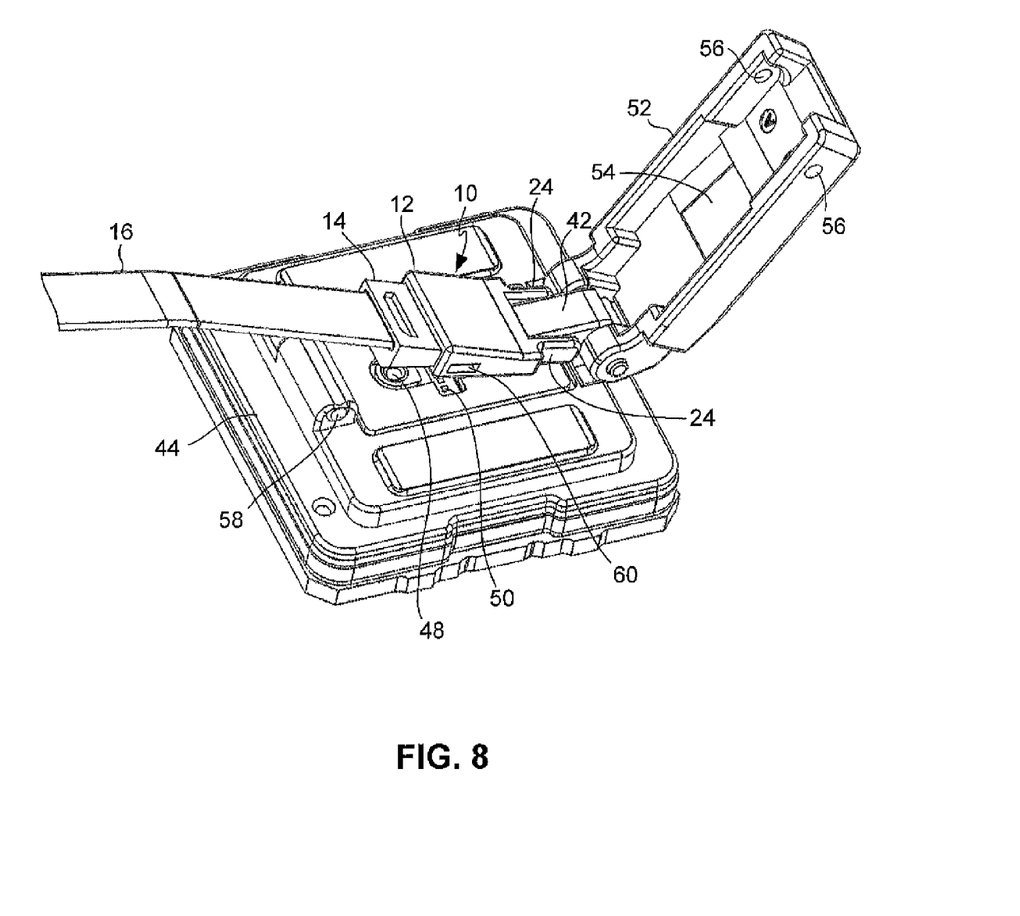
FIG. 8 is similar to FIG. 7, illustrating a further step in the method.

To connect optical cable connector assembly 10 to optical transceiver module 40, the user first engages arms 24 with an engagement portion 42 of the transceiver module housing 44, as shown in FIG. 8. The above-described pair of bumps or protuberances 26 at the distal ends of arms 24 engages a corresponding pair of holes or recesses 46 on engagement portion 42. The engagement between arms 24 and engagement portion 42 is a snap fit. That is, arms 24 flex or bow slightly outwardly as they are placed around engagement portion 42, and protuberances 26 then snap into recesses 46, returning arms 24 to a relaxed or unflexed state. Although in the exemplary embodiment the engagements on the distal ends of arms 24 are bumps or protuberances 26 while the mating engagements on transceiver module housing 44 are recesses 46 (FIG. 7), in other embodiments (not shown) the engagements on the distal ends of such arms can be recesses while the mating engagements on such a transceiver module housing can be protuberances. Still other embodiments can include other types of pivoting user-operable engagements between the connector cover and the optical transceiver module.

The resulting engagement between arms 24 and transceiver module housing 44 provides a means for allowing optical cable connector assembly 10 to pivot with respect to transceiver module housing 44. That is, the engagement between arms 24 and transceiver module housing 44 is a pivoting engagement or defines a pivot. With optical cable connector assembly 10 beginning in the position shown in FIG. 8, in which arms 24 are engaged with transceiver module housing 44, a user can then pivot optical cable connector assembly 10 downwardly toward the upper portion of transceiver module housing 44. As optical cable connector assembly 10 is pivoted downwardly, alignment pins 18 (FIG. 2) are received in a corresponding pair of bores 48 (FIG. 7). Optical cable connector assembly 10 is pivoted downwardly until it reaches a position (FIG. 9) in which the lower portion of optical cable connector assembly 10 abuts the upper portion of transceiver module housing 44. Note that in this position, optical port region 38 (FIG. 2) of reflecting optical connector 14 is aligned along optical paths (not shown) with a corresponding optical port region 50 (FIG. 7) of optical transceiver module 40, enabling communication of optical signals between reflecting optical connector 14 and optical transceiver module 40.

The above-described two-step process of connecting optical cable connector assembly 10 to optical transceiver module 40, by which arms 24 are first engaged with transceiver module housing 44 to form a pivot, and then optical cable connector assembly 10 is pivoted downwardly into place, is advantageous. Arms 24 or a similar structure may help the user guide optical cable connector assembly 10. Also, the initial snap engagement between optical cable connector assembly 10 and transceiver module housing 44 can provide tactile feedback to the user. Absent such an initial engagement, due to the small size of these devices (transceiver module housing 44 can have a size on the order of about, for example, 20 mm along each side of its base), a user may have difficulty aligning an optical cable connector assembly with an optical transceiver module. Alignment pins 18 are small and fragile and easily can be damaged if they are not aligned with bores 48 as optical cable connector assembly 10 is lowered onto transceiver module housing 44. For example, pin 18 can be bent if it is inadvertently forced against the rim of bore 48 or if it enters bore 48 at a glancing angle rather than entering bore 48 in a centered orientation. Pivoting optical cable connector assembly 10 downwardly in the manner described above ensures that alignment pins 18 enter bores 48 in a centered orientation.

Figure 9:
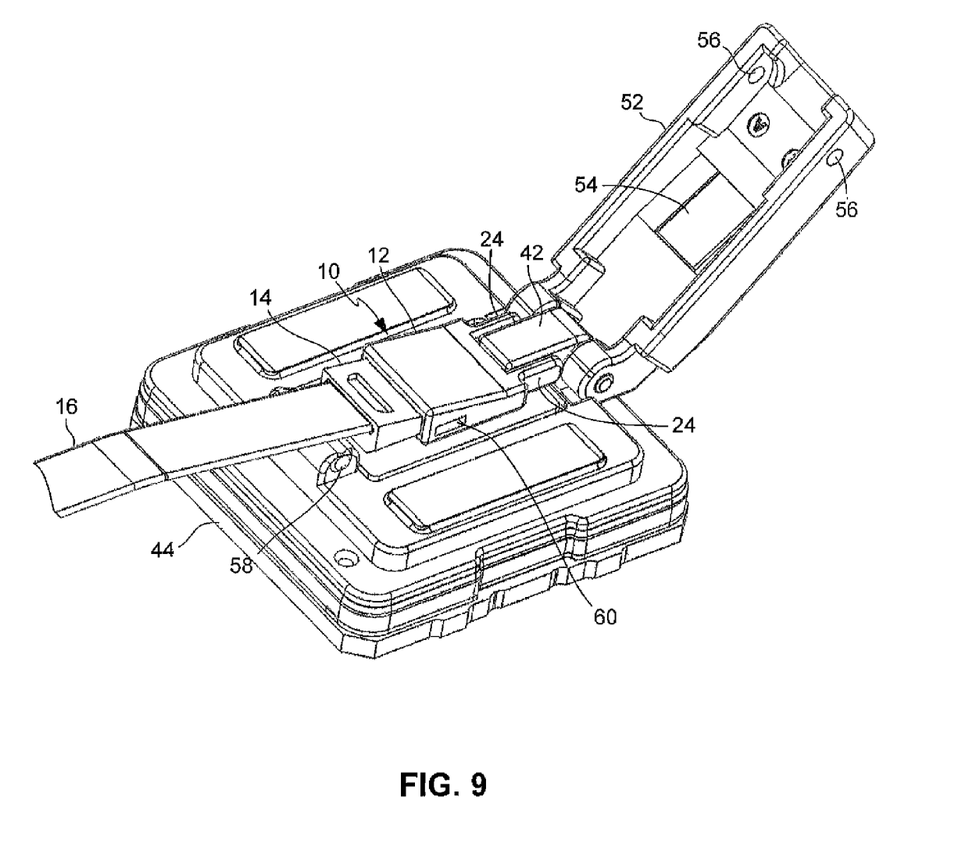
FIG. 9 is similar to FIGS. 7-8, illustrating a still further step in the method.
Figure 10:
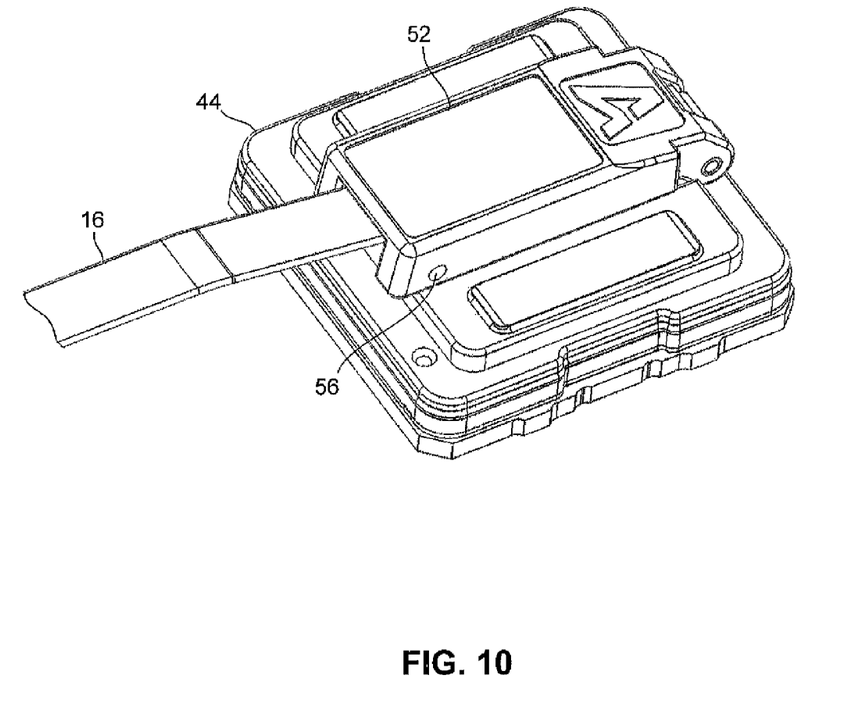
FIG. 10 is similar to FIGS. 7-8, illustrating yet a further step in the method.

After optical cable connector assembly 10 has been pivoted to the position shown in FIG. 9, in which the lower portion of optical cable connector assembly 10 abuts the upper portion of transceiver module housing 44, a hinged cover 52 of optical transceiver module 40 can be used to secure optical cable connector assembly 10 in place. More specifically, a user pivots hinged cover 52 until it contacts connector cover 12 of optical cable connector assembly 10, as shown in FIG. 10. A resilient pressure pad 54 inside hinged cover 52 provides a bias force against optical cable connector assembly 10 that holds optical cable connector assembly 10 securely in place against the upper portion of transceiver module housing 44. Hinged cover 52 is maintained in a closed position by a snap fit between a pair of holes 56 in hinged cover 52 and a corresponding pair of bumps 58 on transceiver module housing 44.

It can be noted that after optical cable connector assembly 10 has been connected to optical transceiver module 40 in the manner described above, optical signals can be communicated between optical cable connector assembly 10 and optical transceiver module 40. That is, electrical signals that optical transceiver module 40 receives from the printed circuit board (not shown) on which it is mounted are converted to optical signals by electrical-to-optical conversion circuitry (e.g., an array of lasers or similar light sources) in optical transceiver module 40, and the resulting optical signals are emitted from optical transceiver module 40 along some of the optical paths (not shown) between optical transceiver module 40 and reflecting optical connector 14. Similarly, optical signals that optical transceiver module 40 receives from reflecting optical connector 14 via others of the optical paths are converted to electrical signals by optical-to-electrical conversion circuitry (e.g., an array of photodiodes or similar light detectors) in optical transceiver module 40, and the resulting electrical signals are conveyed to the printed circuit board.

To disconnect optical cable connector assembly 10 from optical transceiver module 40, the above-described process can be reversed. Alternatively, a tool (not shown) similar to tweezers but having hooked ends that can engage the pair of slots 60 (FIG. 9) on connector cover 12 can be used to lift optical cable connector assembly 10 away from optical transceiver module 40.

One or more illustrative embodiments of the invention have been described above. However, it is to be understood that the invention is defined by the appended claims and is not limited to the specific embodiments described.

What is claimed is:

1. A connector cover for a reflecting connector, the reflecting connector having a plurality of fiber ports for retaining ends of a plurality of optical fibers therein, an upper portion with at least one optical reflector, the connector cover comprising:
   a body having a lower recessed portion configured to receive a portion of the reflecting connector, the body further having an upper housing portion covering the optical reflector when the reflecting connector is received in the lower recessed portion of the body; and
   a pair of arms extending from a forward end of the body, each arm of the pair of arms having a distal end with an arm distal end engagement, each arm distal end engagement configured to pivotally engage a corresponding transceiver module housing engagement on an optical transceiver module housing.

2. The connector cover of claim 1, wherein the arm distal end engagement is a protuberance extending from the arm into a space between the pair of arms and terminating in the space.

3. The connector cover of claim 1, wherein the lower recessed portion has a pair of L-shaped sidewalls, each L-shaped sidewall of the pair of L-shaped sidewalls extending from the upper housing portion.

4. The connector cover of claim 1, wherein each L-shaped sidewall has a sidewall engagement.

5. The connector cover of claim 4, wherein the sidewall engagement is an opening in the sidewall.

6. A method for using a connector cover for a reflecting connector, the reflecting connector having a plurality of fiber ports for retaining ends of a plurality of optical fibers therein, an upper portion with at least one optical reflector, the method comprising:
   sliding a forward end of the reflecting connector into a rearward end of a body of the connector cover, the body of the connector cover having a lower recessed portion configured to receive a portion of the reflecting connector when the forward end of the reflecting connector is slid into the rearward end of the body of the connector cover, the body of the connector cover further having an upper housing portion covering the optical reflector when the reflecting connector is received in the lower recessed portion of the body, wherein a pair of arms extends from a forward end of the body, each arm of the pair of arms having a distal end with an arm distal end engagement;
   engaging the arm distal end engagements of the pair of arms with corresponding transceiver module housing engagements on an optical transceiver module housing, a portion of the optical transceiver module housing being received in the space between the pair of arms; and
   following engaging the arm distal end engagements of the pair of arms with the corresponding transceiver module housing engagements, pivoting the connector cover on a pivot defined by the arm distal end engagements engaged with the corresponding transceiver module housing engagements.

7. The method of claim 6, wherein the arm distal end engagement is a protuberance extending from the arm into a space between the pair of arms.

8. The method of claim 6, wherein the lower recessed portion has a pair of L-shaped sidewalls, each L-shaped sidewall of the pair of L-shaped sidewalls extending from the upper housing portion.

9. The method of claim 6, wherein each L-shaped sidewall has a sidewall engagement.

10. The method of claim 9, wherein the sidewall engagement is an opening in the sidewall.

11. The method of claim 6, wherein pivoting the connector cover on the pivot comprises pivoting the connector cover until a pin extending from a lower portion of the reflecting connector is received in a corresponding bore in an upper portion of the transceiver module housing.

12. The method of claim 11, further comprising pivoting a module cover of the optical transceiver module housing until the module cover secures the connector cover and reflecting connector against an upper portion of the optical transceiver module housing.

13. The method of claim 12, wherein a first portion of a snap engagement of the module cover engages a mating second portion of the snap engagement on the optical transceiver module housing to retain the module cover in a closed position with the connector cover and reflecting connector secured against the upper portion of the optical transceiver module housing.

14. An optical transceiver connector system, comprising:
a connector cover for a reflecting connector, the reflecting connector having a plurality of fiber ports for retaining ends of a plurality of optical fibers therein, an upper portion with at least one optical reflector, the connector cover including a body and a pair of arms extending from a forward end of the body, each arm of the pair of arms having a distal end with an arm distal end engagement, each arm distal end engagement configured to pivotally engage a corresponding transceiver module housing engagement on an optical transceiver module housing, the body having a lower recessed portion configured to receive a portion of the reflecting connector, the body further having an upper housing portion covering the optical reflector when the reflecting connector is received in the lower recessed portion of the body; and
an optical transceiver module having a pair of transceiver module housing engagements configured to pivotally engage the arm distal end engagements of the pair of arms.

15. The optical transceiver connector system of claim 14, wherein the arm distal end engagement is a protuberance extending from the arm into a space between the pair of arms and terminating in the space.

16. The optical transceiver connector system of claim 14, wherein the lower recessed portion has a pair of L-shaped sidewalls, each L-shaped sidewall of the pair of L-shaped sidewalls extending from the upper housing portion.

17. The optical transceiver connector system of claim 14, wherein each L-shaped sidewall has a sidewall engagement.

18. The optical transceiver connector system of claim 17, wherein the sidewall engagement is an opening in the sidewall.

19. The optical transceiver connector system of claim 14, wherein the optical transceiver module further comprises a pivoting module cover on the optical transceiver module housing.

\* \* \* \* \*